US006901849B1

(12) United States Patent
Cohen et al.

(10) Patent No.: US 6,901,849 B1
(45) Date of Patent: Jun. 7, 2005

(54) JUICE EXTRACTOR APPLIANCE AND CUTTER DISC THEREFOR

(75) Inventors: Eli Cohen, Lev HaSharon (IL); Ann Grant, New York, NY (US)

(73) Assignee: AAC Trade Ltd., New York, NY (US)

( * ) Notice: Subject to any disclaimer, the term of this patent is extended or adjusted under 35 U.S.C. 154(b) by 0 days.

(21) Appl. No.: 10/825,124

(22) Filed: Apr. 16, 2004

(51) Int. Cl.$^7$ .............................. A23N 1/00; A23L 1/00
(52) U.S. Cl. ......................................... 99/511; 99/513
(58) Field of Search ................. 99/492, 495, 509–513, 99/629–634, 348; 366/601, 314, 297–300, 291; 241/37.5, 92, 282.1, 282.2; 494/36, 37, 43, 47, 10, 85; 426/61, 63, 49, 52, 533, 599, 640, 231–233

(56) References Cited

U.S. PATENT DOCUMENTS

| | | | | |
|---|---|---|---|---|
| 4,716,823 A | * | 1/1988 | Capdevila | 99/510 |
| 4,941,403 A | * | 7/1990 | Cimenti | 99/492 |
| 6,029,568 A | * | 2/2000 | Pascotti et al. | 99/489 |
| 6,397,736 B1 | * | 6/2002 | Tseng et al. | 99/511 |
| 6,742,447 B1 | * | 6/2004 | Chen | 99/510 |

* cited by examiner

Primary Examiner—Timothy F. Simone
(74) Attorney, Agent, or Firm—G.E. Ehrlich (1995) Ltd.

(57) ABSTRACT

A juice extractor appliance, and a cutter disc therefor, the cutter disc being eccentrically mountable with respect to a feed tube for feeding food articles and being formed, on its surface facing feed tube, with a first group of blades in a circular region centrally of the cutter disc, and with a second group of blades in an outer peripheral region of the cutter disc around the central region. The first group of blades consist of two blades located on opposite sides of the central circular region and diametrically aligned with each other and with the center of the central circular region. The second group of blades consist of a plurality of lines of blades in the outer peripheral region extending tangentially to the center circular region.

12 Claims, 3 Drawing Sheets

JUICE EXTRACTOR APPLIANCE AND CUTTER DISC THEREFOR

FIELD AND BACKGROUND OF THE INVENTION

The present invention relates to a juice extractor appliance, and to a cutter disc for such an appliance. The invention is particularly useful, and is therefore described below, with respect to the appliance described in U.S. Pat. No. 6,397,736, but utilizes another construction of cutter disc providing improved results when used in such an appliance.

U.S. Pat. No. 6,397,736 describes a juice extractor appliance for extracting juice from various fruits and vegetables. The described appliance includes a housing having an inlet feed tube for feeding the food articles into the appliance, and an outlet for outletting the juice extracted therefrom. The housing further includes a cutter disc for cutting the food articles into a pulp saturated with juice; a separator device, in the form of a strainer basket, for separating the juice from the pulp; and an electrical motor drive for driving the cutter disc. In order to eliminate any dead angle of cutting by the disc, the disc is formed, on a center region of its surface facing the feed tube, with a plurality of radial rows of blades arranged in the form of a cross, with one blade extending across the center of the disc.

OBJECTS AND BRIEF SUMMARY OF THE PRESENT INVENTION

An object of the present invention is to provide a juice extractor appliance, and particularly a cutting disc for such an appliance, of an improved and simpler construction.

According to one broad aspect of the present invention, there is provided a juice extractor appliance for extracting juice from food articles, comprising: a housing having an inlet feed tube for feeding the food articles into the appliance, and an outlet for outletting the juice extracted therefrom; a cutter disc rotatable mounted within the housing eccentrically with respect to said inlet feed tube for cutting the food articles fed into the housing into a pulp saturated with juice; a separator device within the housing for separating the juice from the pulp, which juice is outletted through the housing outlet; and a drive within the housing for driving the cutter disc; the cutter disc being formed on its surface facing the feed tube with a first group of blades in a circular region centrally of the cutter disc, and with a second group of blades in an outer peripheral region of the cutter disc around the central region; the first group of blades consisting of two blades located on opposite sides of the central circular region and diametrically aligned with each other and with the center of the central circular region; one of the blades extending diametrically across one side of the central circular region and terminating substantially at the center thereof, the other of the blades extending diametrically across the opposite side of the central circular region and terminating short of the center thereof; the second group of blades consisting of a plurality of lines of blades in the outer peripheral region radiating from the center circular region.

Several preferred embodiments of the invention are described below for purposes of example. In one described preferred embodiment, the blades of the second group extend tangentially with respect to the center circular region, and in another described embodiment, they radiate from approximately the mid-point of radial lines through the central circular region In both of the latter described embodiments, the central region of the cutter disc is integrally formed with the outer peripheral region. However, a further embodiment is described wherein the central region of the cutter disc is separate from the outer peripheral region of the cutter disc such as to act, with a pusher member when used to feed the food articles through the inlet feed tube, to reduce or restrict rotation of the food articles when engaged by the rotated blades of the outer peripheral region of the cutter disc.

According to another aspect of the present invention, there is provided a cutter disc for a juice extractor appliance having a feed tube through which food articles are to be fed for extracting juice therefrom; the cutter disc including means for mounting the cutter disc with respect to the feed tube, and being formed, on its surface to face the feed tube, with a first group of blades in a circular region centrally of the cutter disc, and with a second group of blades in an outer peripheral region around the central circular region; the first group of blades consisting of two blades located on opposite sides of the central circular region and diametrically aligned with each other and with the center of the central circular region; one of the blades extending diametrically across one side of the central circular region and terminating substantially at the center thereof, the other of the blades extending diametrically across the opposite side of the central circular region and terminating short of the center thereof; the second group of blades consisting of a plurality of lines of blades in the outer peripheral region radiating from the center circular region.

According to yet another aspect of the present invention, there is provided a cutter disc for a juice extractor appliance having a feed tube through which food articles are to be fed for extracting juice therefrom; the cutter disc including means for mounting the cutter disc with respect to the feed tube, and being formed, on its surface to face the feed tube, with a first group of blades in a circular region centrally of the cutter disc, and with a second group of blades in an outer peripheral region around the central circular region; the first group of blades consisting of at least one blade located on each of the sides of the central circular region and diametrically aligned with each other and with the center of the central circular region; the second group of blades consisting of a plurality of lines of blades in the outer peripheral region radiating from the center circular region; the central region including the first group of blades being separate, and rotatable with respect to the outer peripheral region including the second group of blades such as to permit rotation of the outer peripheral region independently of the central region.

Further features and advantages of the invention will be apparent from the description below.

BRIEF DESCRIPTION OF THE DRAWINGS

The invention is herein described, by way of example only, with reference to the accompanying drawings, wherein.

Figure 1:
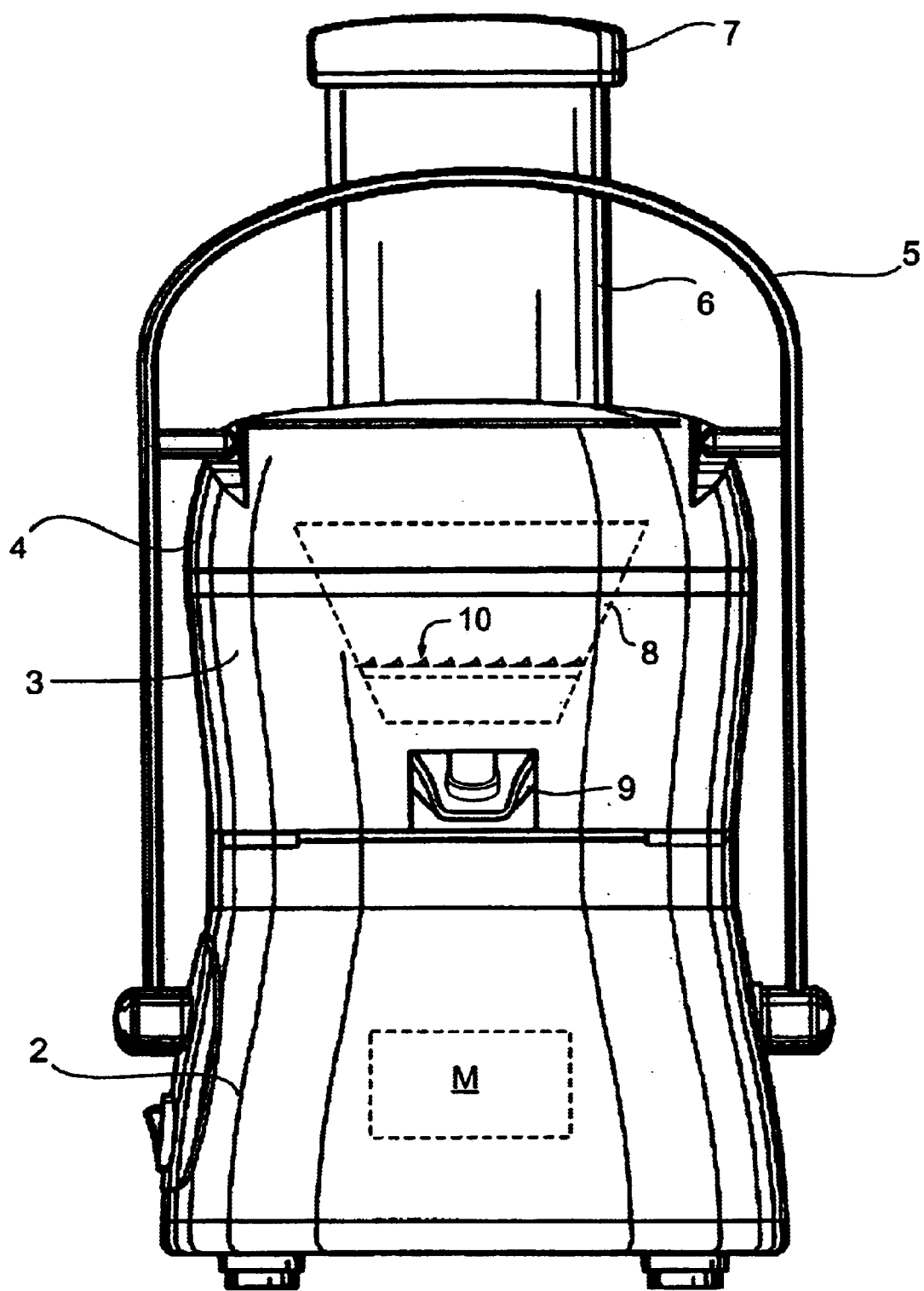
FIG. 1 illustrates one form of juice extractor appliance constructed in accordance with the present invention.

It is to be understood that the foregoing drawings, and the description below, are provided primarily for purposes of facilitating understanding the conceptual aspects of the invention and various possible embodiments thereof, including what is presently considered to be a preferred embodiment. In the interest of clarity and brevity, no attempt is made to provide more details than necessary to enable one skilled in the art, using routine skill and design, to understand and practice the described invention. It is to be further understood that the embodiment described is for purposes of example only, and that the invention is capable of being embodied in other forms and applications than described herein.

DESCRIPTION OF A PREFERRED EMBODIMENT

As indicated earlier, the invention of the present application is particularly useful in an appliance similar to that described in U.S. Pat. No. 6,397,736; accordingly, the appliance illustrated in the drawings and more particularly described below, is basically the appliance of that patent but utilizing a different construction for the cutter disc.

Thus, the appliance illustrated in FIG. 1 includes a housing constituted of a lower base 2, an upper base 3, and a top cover 4. The illustrated appliance further includes a locking bar 5 pivotally mounted to the lower base 2 and engageable with the cover 4 for selectively locking the cover in place, or unlocking it to enable access into the interior of the housing.

The cover 4 includes an inlet feed tube 6 for introducing food articles into the housing, and a pusher member 7 for manually pushing the food articles into the housing. The housing itself includes an electrical motor drive M for driving a rotary shaft coupled to a strainer basket 8 and a juicer outlet 9. The strainer basket 8 includes a cutter disc 10, located in alignment with the feed tube 6 so as to cut the food articles received through the feed tube into a pulp saturated with the juice to be extracted. The strainer basket 8 separates the juice from the pulp and directs the juice to the outlet 9 for removal from the housing. Cover 4 includes a lateral extension (not shown) for receiving or locating a receptacle (also not shown) to collect the pulp remaining in the strainer basket 8 after extraction of the juice.

Further details of the construction and operation of such an appliance are available in the above-cited U.S. Pat. No. 6,397,736, the contents of which are incorporated herein by reference.

Figure 2:
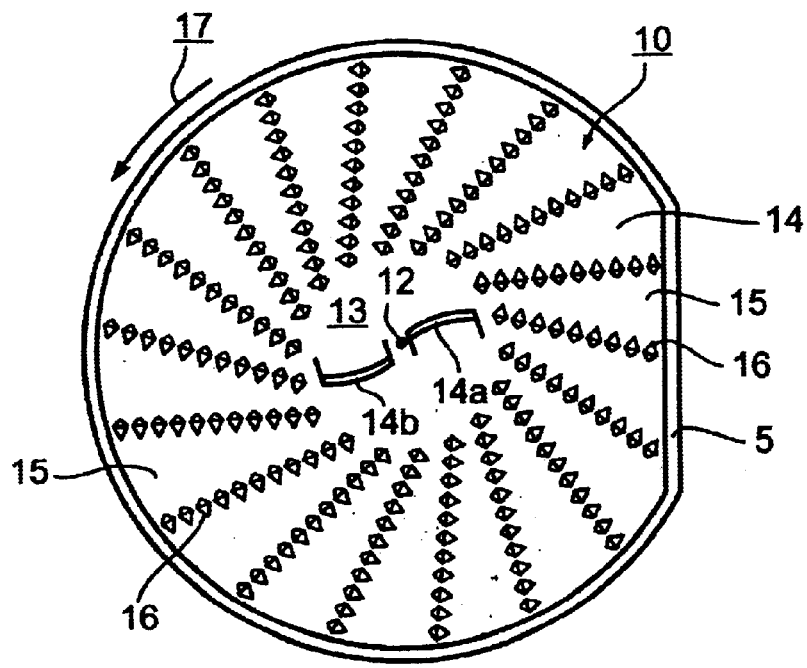
FIG. 2 is a top view of the feed tube in the appliance of FIG. 1 and the portion of the cutter disc viewable through the feed tube.
Figure 3:
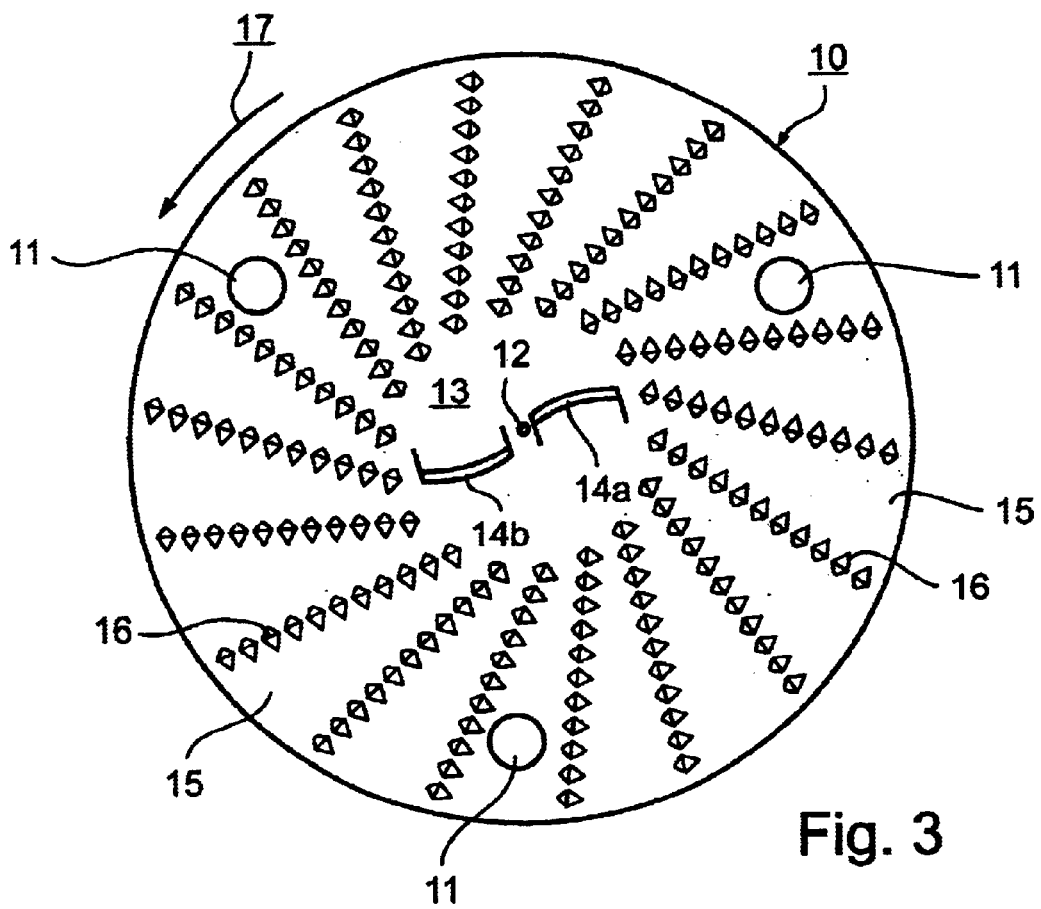
FIG. 3 is a top plan view of the complete cutter disc within the appliance.

According to the present invention, the cutter disc 10 is of a novel construction as more particularly illustrated in FIGS. 2 and 3. It is mounted within the appliance, by means of openings 11 (FIG. 3) adapted to receive threaded fasteners, such that the cutter disc is eccentric with respect to the feed tube 6, as shown in FIG. 2.

The center of cutter disc 10, which is its rotational axis, is shown at 12 in FIGS. 2 and 3. The cutter disc consists of (a) a circular region 13 centrally of the cutter disc and formed, on its upper surface facing the feed tube 5, with a first group of blades 14a, 14b', and (b) an outer peripheral region 15 around the central region 13 and formed with a second group of blades 16. The first group of blades in the central circular region 13 consists of only the two blades 14a, 14b; whereas the second group of blades in the outer peripheral region 15 consists of a plurality of lines of blades radiating from the central circular region 13. In the embodiment of FIGS. 2 and 3, the second group of blades in the outer peripheral region 15 consists of a plurality of blades extending tangentially to the central circular region 13.

Blades 14a and 14b in the central circular region 13 are substantially longer than blades 16 in the outer peripheral region 15. Blade 14a is longer than blade 14b, and its inner end terminates substantially at the center 12 of the circular central region 13. The two blades 14a, 14b have substantially straight diametrically-aligned cutting edges with a very slight convex curvature in the direction of rotation of the cutter disc, shown by arrow 17 in FIGS. 2 and 3.

Figure 4:
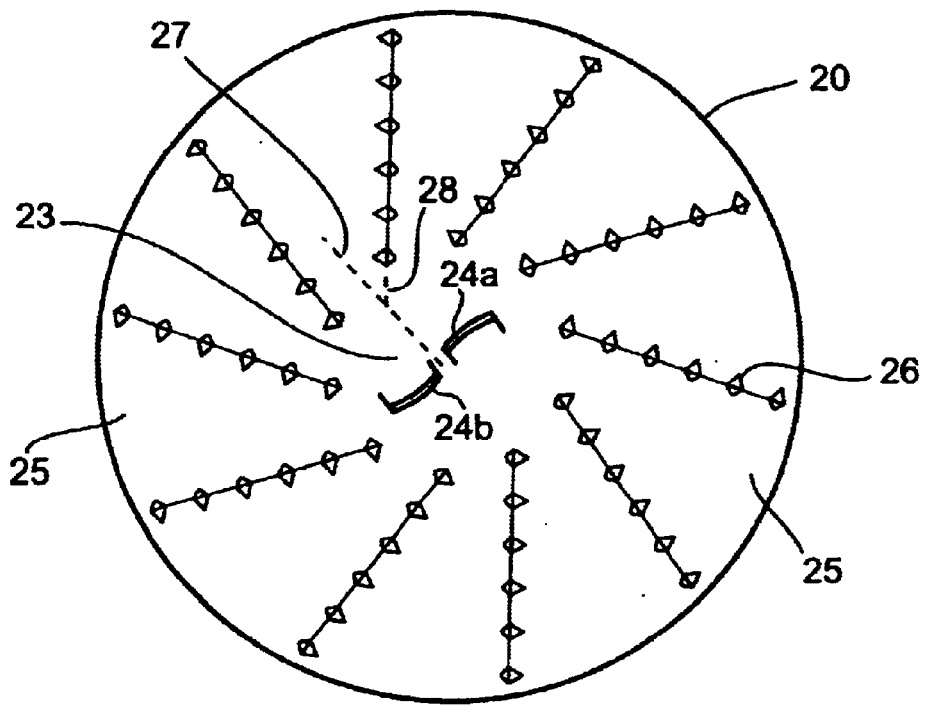
FIG. 4 is a top plan view of another cutter disc constructed in accordance with the present invention.

FIG. 4 illustrates another construction of cutter disc, therein designated 20, also having a central circular region 23 formed with two cutter blades 24a, 24b, and an outer peripheral region 25 formed with a plurality of lines of cutter blades 26 radiating from the central circular region 23. In this case, however, rather than having the blades of the outer peripheral region extend tangentially to the central circular region, they radiate from approximately the mid-point of radial lines through the central circular region. The latter is shown by radial line 27 from the center of the disc 22 to the outer border of the central circular region 23, the mid-point of which radial line is intersected by line 28 of one line of blades 26 in the outer peripheral region 25.

Figure 5:
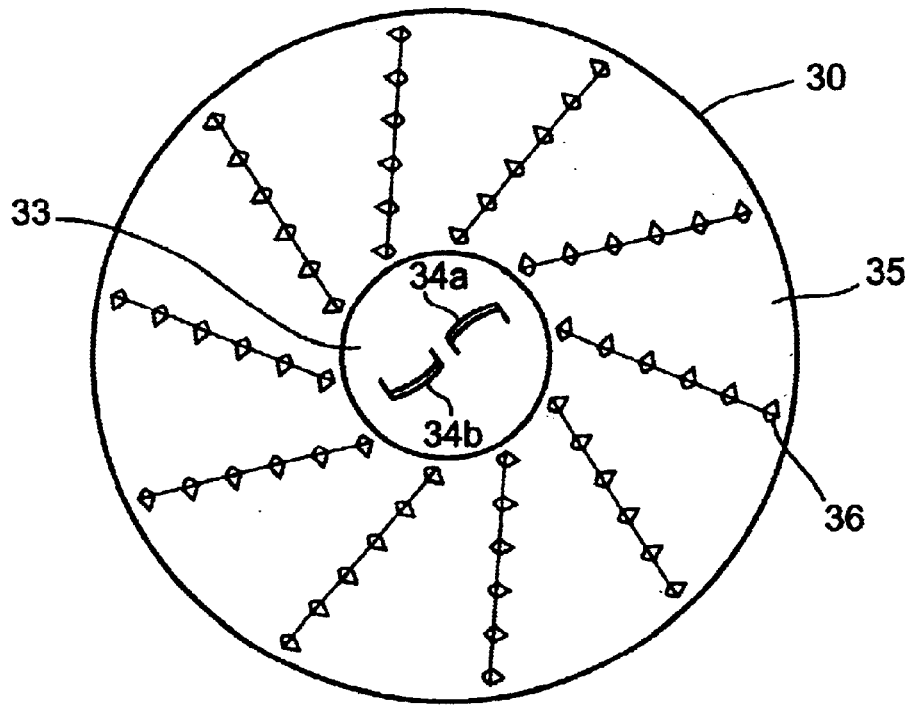
FIG. 5 is a top plan view of a further cutter disc constructed in accordance with the present invention wherein the circular center region is separate from the outer peripheral region to allow independent rotation of one with respect to the other.

In the above-described embodiments, the circular central region of the cutter disc (13, 23) is integrally formed with the outer peripheral region (15, 25), such that both regions are rotated together with the strainer basket 8 during the operation of the appliance. FIG. 5 illustrates a cutter disc, therein generally designated 30, of a similar construction as cutter disc 20 in FIG. 4, except that the center circular region 33 of the cutter disc, formed with the two blades 34a, 34b, is separate from the outer peripheral region 35 formed with the blades 36, such that the outer region 35 is rotatable with respect to the inner region 33. In this construction, the pusher member (7, FIG. 1) is preferably formed with gripping surfaces on its inner face engageable with the food articles being pushed through the inlet feed tube (6, FIG. 1) such that a food article fed through the inlet feed tube is firmly gripped between the inner gripping surface of the pusher member and blades 34a, 34b of the inner circular region 33 of the cutter disc 30, thereby reducing or inhibiting rotation of the food article when engaged by the rotating blades 36 of the outer peripheral region 35 of the cutter disc.

Such constructions of cutter discs, when mounted eccentrically with respect to the feed tube, effectively cut the food articles fed through the feed tube into a pulp saturated with liquid, while at the same time permitting whole food articles to be fed into the appliance without the problem of central dead angle of grinding.

While the invention has been described with respect to one preferred embodiment, it will be appreciated that this is set forth for purposes of illustration, and that many other variations, modifications and applications of the invention may be made.

What is claimed is:

1. A juice extractor appliance for extracting juice from food articles, comprising:

a housing having an inlet feed tube for feeding the food articles into the appliance, and an outlet for outletting the juice extracted therefrom;

a cutter disc rotatably mounted within said housing eccentrically with respect to said inlet feed tube for cutting the food articles fed into the housing into a pulp saturated with juice;

a separator device within said housing for separating the juice from the pulp, which juice is outletted through said housing outlet;

and a drive within said housing for driving said cutter disc;

said cutter disc being formed on its surface facing the feed tube with a first group of blades in a circular region centrally of the cutter disc, and with a second group of blades in an outer peripheral region of the cutter disc around said central region;

said first group of blades consisting of two blades located on opposite sides of said central circular region and diametrically aligned with each other and with the center of said central circular region; one of said blades extending diametrically across one side of said central circular region and terminating substantially at the center thereof, the other of said blades extending diametrically across the opposite side of said central circular region and terminating short of the center thereof;

said second group of blades consisting of a plurality of lines of blades in said outer peripheral region radiating from said center circular region;

said central region of the cutter disc on which said first group of blades is formed being separate from and rotatable with respect to said outer peripheral region on which said second group of blades is formed.

2. The appliance according to claim 1, wherein the blades of said second group extend tangentially with respect to said center circular region.

3. The appliance according to claim 1, wherein the blades of said second group radiate from approximately the midpoint of radial lines through said central circular region.

4. The appliance according to claim 1, wherein said appliance further includes a pusher member including a gripping surface engageable with food articles when fed through the inlet feed tube; and wherein said central region of the cutter disc is separated from said outer peripheral region such as to act with said pusher member to reduce or inhibit rotation of the food article when engaged by the rotating blades of the outer peripheral region of the cutter disc.

5. The appliance according to claim 1, wherein the two blades of said first group have substantially straight, slightly convex, diametrically-aligned cutting edges.

6. The appliance according to claim 1, wherein said housing comprises a base including said drive and said outlet; a top cover including said inlet feed tube; and a locking bar pivotally mounted to said base and engageable with said top cover for locking said top cover to said base.

7. A cutter disc for a juice extractor appliance having a feed tube through which food articles are to be fed for extracting juice therefrom;

said cutter disc including means for mounting the cutter disc with respect to the feed tube, and being formed, on its surface to face the feed tube, with a first group of blades in a circular region centrally of the cutter disc, and with a second group of blades in an outer peripheral region around the central circular region;

said first group of blades consisting of two blades located on opposite sides of said central circular region and diametrically aligned with each other and with the center of said central circular region; one of said blades extending diametrically across one side of said central circular region and terminating substantially at the center thereof, the other of said blades extending diametrically across the opposite side of said central circular region and terminating short of the center thereof;

said second group of blades consisting of a plurality of lines of blades in said outer peripheral region radiating from said center circular region;

said central region being separated from, and rotatable with respect to, said outer peripheral region.

8. The cutter disc according to claim 7, wherein the blades of said second group extend tangentially with respect to said center circular region.

9. The cutter disc according to claim 7, wherein the blades of said second group radiate from approximately the midpoints of radial lines through said central circular region.

10. The cutter disc according to claim 7, wherein the two blades of said first group have substantially straight, slightly convex, diametrically-aligned cutting edges.

11. A cutter disc for a juice extractor appliance having a feed tube through which food articles are to be fed for extracting juice therefrom;

said cutter disc including means for mounting the cutter disc with respect to the feed tube, and being formed, on its surface to face the feed tube, with a first group of blades in a circular region centrally of the cutter disc, and with a second group of blades in an outer peripheral region around the central circular region;

said first group of blades consisting of at least one blade located on each of the opposite sides of said central circular region and diametrically aligned with each other and with the center of said central circular region;

said second group of blades consisting of a plurality of lines of blades in said outer peripheral region radiating from said center circular region;

said first group of blades being separate from, and rotatable with respect to, said outer peripheral region including said second group of blades such as to permit rotation of said outer peripheral region independently of said central region.

12. The cutter disc according to claim 11, wherein said first group of blades consist of two blades.

* * * * *